Oct. 9, 1956
T. ANTHONY
2,765,628
FOUR-WAY CHANGE OVER VALVE
Filed Oct. 8, 1954
2 Sheets-Sheet 2
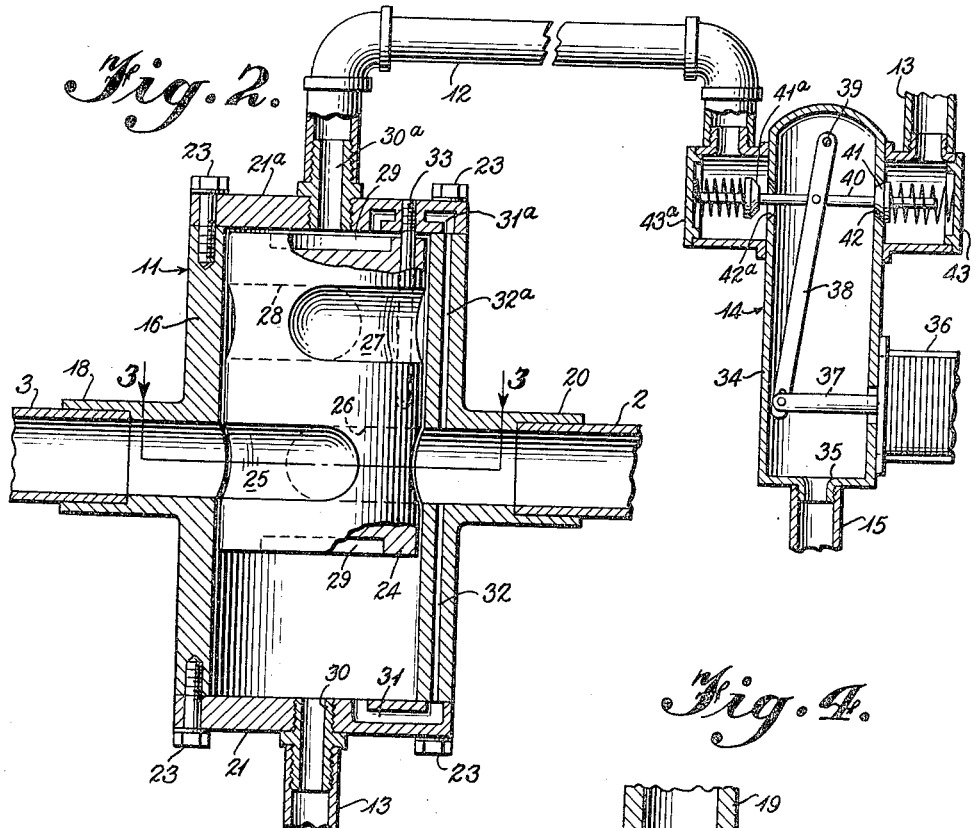
*Fig. 2.*
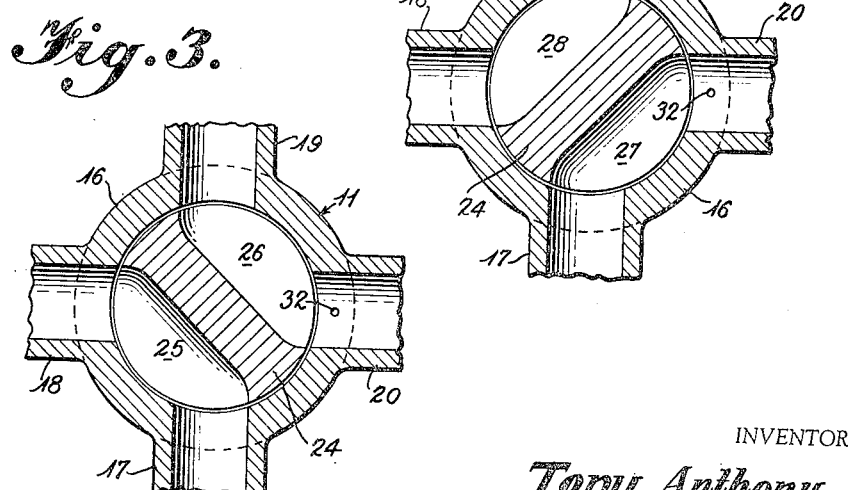
*Fig. 3.*
*Fig. 4.*
INVENTOR
*Tony Anthony*
BY *Mead, Browne, Schuyler & Beveridge*
ATTORNEYS

United States Patent Office 2,765,628
Patented Oct. 9, 1956

2,765,628

FOUR-WAY CHANGE OVER VALVE

Tony Anthony, Orlando, Fla.

Application October 8, 1954, Serial No. 461,098

7 Claims. (Cl. 62—3)

This invention relates to heating and cooling systems in which four-way valves are employed. More particularly, the invention pertains to a multi-way valve which is adapted for use in a reverse cycle system such as an automatic air conditioning unit which may be selectively or alternatively employed for heating or cooling purposes.

The present invention constitutes an improvement over valves and systems of the type disclosed in United States Letters Patent No. 2,672,887 granted to Virgil W. Tipton on March 23, 1954. In some of its detailed aspects the invention relates to certain improvements in valve structures of the type disclosed in the patent and in the means by which the valves are operated.

A primary object of my invention is to provide an improved four-way change over valve which is both practical and positive in operation.

Another object of my invention is to provide a valve of the type described above which is operated by pressure available from the system which it controls.

Still a further object of my invention is to provide a valve which may be automatically operated to keep a room at constant temperature by utilizing an air conditioning system for either heating or cooling purposes, depending upon the ambient temperature.

A further object of my invention is to provide an improved four-way change over valve which is economical and easy to manufacture.

Still another object of my invention is to provide a valve of this type in which the ports are so dimensioned as to eliminate any drop of pressure in fluids passing through said ports.

These, and other objects, are achieved by the provision of a cylindrical valve casing having two pairs of opposed cylindrical valve ports extending from the side walls of the casing. The axes of the four ports lie in a common plane which is perpendicular to the longitudinal axis of the cylindrical casing. Disposed within the cylindrical casing is a valve piston which is slidable between two limits defined by end caps which close the ends of the cylindrical casing. The piston is provided with two sets of passageways which are so located that when the piston abuts one end cap, one set of passageways is in registry with the valve ports and connects certain of the valve ports to each other. When the piston abuts the other end cap of the cylinder, the other set of passageways is in registry with the valve ports to provide a different connection between the various valve ports.

A restricted passageway is connected between the inner faces of the end caps and one of the valve ports. In the disclosed embodiment, these restricted passageways connect the spaces between the piston and the end caps to the port which is connected to the pressure side of the compressor. The nipples are respectively connected to two ports of a three-way valve. The three-way valve is operated by a thermostatically controlled solenoid and is employed to selectively connect either end cap to a third port which is in communication with the suction side of the compressor. This relieves the pressure against one face of the piston and allows the piston to be moved against the end cap connected to the low pressure or suction side of the compressor. In one end cap of the cylinder, a rod projects inwardly of the cylinder and is received in a longitudinal bore in the piston to prevent rotation of the piston relative to the casing.

Other objects and advantages of my invention will become apparent with reference to the following specification taken in connection with the accompanying drawings.

In the drawings:

Fig. 2 is a longitudinal sectional view taken through the four-way valve and the three-way valve which controls the four-way valve;

Fig. 3 is a cross sectional view taken on the line 3—3 of Fig. 2, and showing the manner in which the ports are connected when the valve piston is disposed in the position shown in Fig. 2; and Fig. 4 is a cross sectional view similar to Fig. 3 and shows the connections of the valve ports if the piston were disposed against the bottom end cap of Fig. 2.

Figure 1:
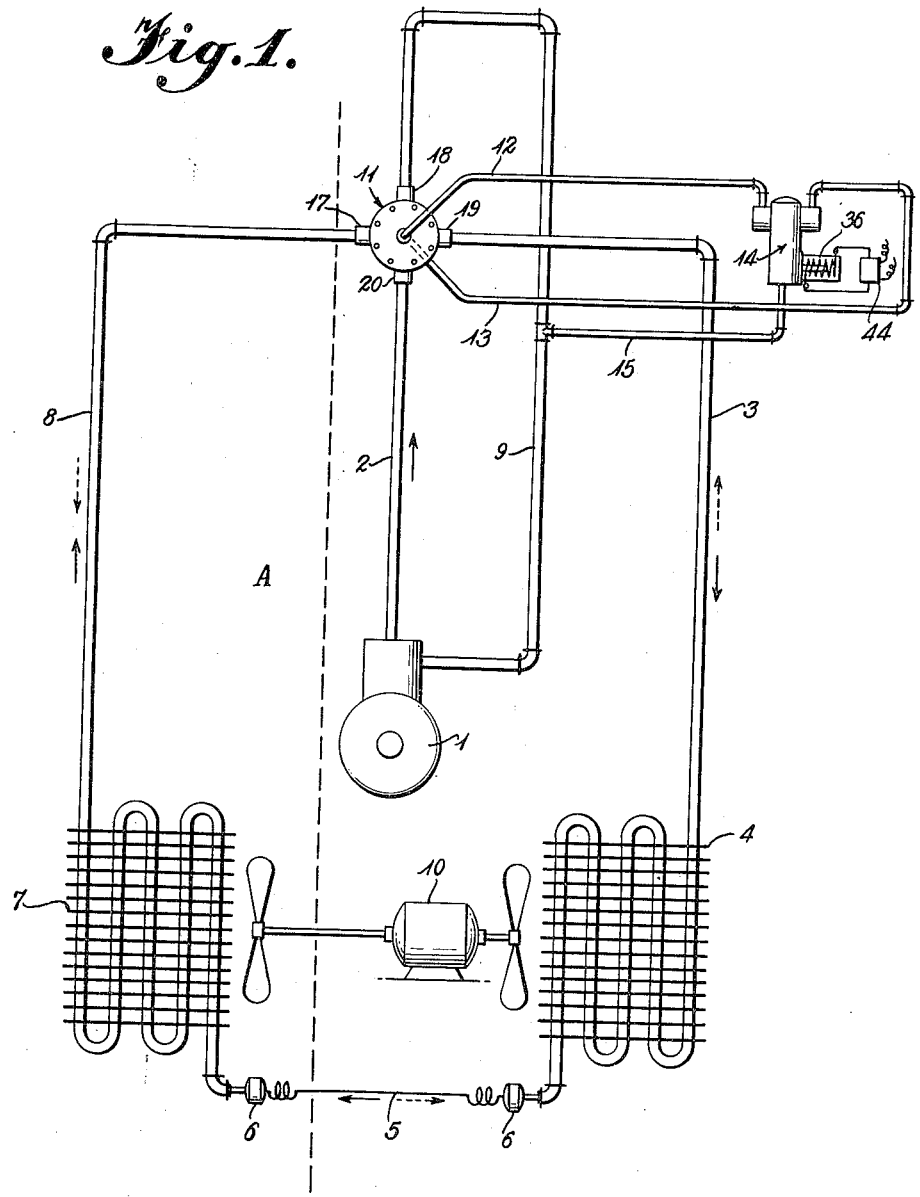
Fig. 1 shows a schematic view of a system employing my improved valve and valve operating means.

The schematic diagram shown in Fig. 1 will first be described as though it were a conventional air conditioning system employed to cool the area A to the left of the dotted line. The components of such a system would include a compressor 1 which is adapted to supply hot gas or refrigerant vapor under pressure to line 2. When used for cooling the room A, the line 2 would be connected to line 3 which conducts the hot gas under pressure to the coils 4. In passing through the coils 4, the hot gas gives up its heat to the coils and becomes liquified. In the liquified state, the fluid then passes through a capillary tube 5 which acts as an expansion valve. If desired, filters 6 may be employed at either end of the tubing 5. Upon emerging from the tubing 5, the liquified refrigerant is allowed to expand into coils 7. In expanding, the fluid absorbs heat from the coils 7, thus cooling area A and becomes vaporized. After being vaporized, the refrigerant passes through line 8 which for cooling purposes would be connected to the exhaust or suction line 9 of the compresser 1. A blower motor 10 is disposed to force a current of air over both coil 4 and coil 7. It will be noted that during this cycle the refrigerant gives up heat as it passes through the coil 4 and absorbs heat as it passes through the coil 7. Since the coils 4 and 7 are of similar construction, and the capillary tube 5 will provide an expansion valve operable for either direction of refrigerant flow, it follows that reverse flow through the system would provide a means for heating the room rather than cooling it. With the fluid circuit connected as shown in Fig. 1, this desirable result may be achieved by providing a means for selectively connecting line 2 to either of line 3 or line 8 and simultaneously connecting line 9 to either line 8 or line 3, respectively.

The selective connection desired is achieved through the use of my improved four-way valve indicated generally by the numeral 11. In addition to the connections described above, the four-way valve is provided with lines 12 and 13 which extend from the end cap nipples of the four-way valve 11 to two ports of a three-way valve indicated generally by the numeral 14. A third port of the three-way valve 14 is connected by line 15 to the suction line 9 of compressor 1.

Referring now to Fig. 2, the four-way valve 11 comprises a cylindrical casing 16. Cylindrical casing 16 is provided with four centrally located and symmetrically disposed through passageways or valve ports 17, 18, 19, and 20 respectively. The passageways project outwardly from the cylindrical casing 16 in order to provide a means for connecting the various pipes to the respective valve ports. The ends of the cylindrical casing 16 are closed by means of end caps 21 and 21a which may be secured to the casing by any conventional means such as bolts 23.

Slidably disposed within the casing 16 is valve piston 24. Valve piston 24 is provided with a first pair of passageways 25 and 26 and a second pair of passageways 27 and 28. Valve piston 24 is slidable between two end positions defined by the end caps 21 and 21a. When the valve piston 24 abuts end cap 21a, as shown in Fig. 2, the passageways 25 and 26 will be in registry with the valve ports and will connect valve port 17 to valve port 18 and also simultaneously connect valve port 19 to valve port 20 as in Fig. 3. When the valve piston 24 abuts end cap 21, the connection will be as shown in Fig. 4 with passageway 27 connecting valve port 17 to valve port 20 and the passageway 28 connecting valve port 18 to valve port 19. At each end of the piston, a recess 29 is provided to assure a fluid connection between the face of the piston and passageway 31, described below.

End caps 21 and 21a are each provided with a nipple 30 and 30a, respectively, which provide means for connecting pipes to conduct fluid to either side of the piston 24. The end caps 21 and 21a are further provided with passageways 31 and 31a which lead from the piston chamber to restricted passageways 32 and 32a which extend longitudinally of casing 16 and are connected into the valve port 20. This connection supplies pressure against both faces of piston 24. Valve piston 24 is moved from one end position to the other by three-way valve 14, which acts to connect one of the nipples 30 or 30a to the suction line 9. Assuming that it was desired to move the valve piston from the position shown in Fig. 2 to a position in which the piston 24 would abut end cap 21, line 13 would be connected to line 9, thus relieving the pressure applied against the lower face of piston 24, creating a differential pressure to cause the piston to move downwardly to abut against end cap 21.

A guide rod 33 is mounted in end cap 21a and projects inwardly of the cylinder into a recess provided in piston 24 for the reception of guide pin 33. Guide pin 33 prevents relative rotation between piston 24 and casing 16, thus assuring proper registry of the valve ports and passageways.

Movement of piston 24 within casing 16 is controlled by the three-way valve 14. Three-way valve 14 comprises a casing 34 which is provided with port 35 at one end thereof. An operating solenoid 36 is mounted upon casing 34 and has an armature 37 which projects into casing 34. The armature 37 is attached to lever 38 which is pivoted to casing 34 by means of a pin 39. Valve rod 40 is pivotally mounted on lever 38 and carries a pair of valve heads 41 and 41a. Casing 34 is provided with a pair of valve seats 42 and 42a upon which the respective valve heads seat. The seating of the valve heads 41 and 41a is cushioned by means of springs, not numbered, which are disposed between the valve heads and the respective chamber walls 43 and 43a. Means, not numbered, are provided on the chambers for connecting fluid lines thereto. Solenoid 36 may be of any conventional construction, however, I have found it preferable to employ a solenoid of the latch type in which the armature is mechanically latched in either position so that it is not necessary to continuously supply current to the coil to hold the armature in one position. Thermostatic switch 44 is also of conventional construction and is employed to connect the solenoid to a power supply when the temperature reaches a predetermined value.

The operation of the system employing my improved four-way valve is as follows. Assuming that the four-way valve 11 and the three-way valve 14 are in the positions shown in Fig. 2, the passageways 25 and 26 will be disposed in the positions illustrated in Fig. 3. With the four-way valve in this position, hot gas under pressure will be supplied to the pipe 2 from the compressor 1. The hot gas will enter valve port 20 and pass through passageway 26 into valve port 19 and hence to line 3. From line 3, the hot gas enters the coils 4 and becomes liquified as it cools in passage through the coils 4. From the coils 4, the liquified refrigerant passes through capillary 5 and expands into the coil 7. The expansion of the liquid in the coils 7 causes the refrigerant to vaporize, thus absorbing heat from the coil 7 and creating a region of cool air which is blown into the room A by the blower motor 10. The vaporized gas then passes into line 8 which is connected to valve port 17. From valve port 17, the gas passes through passageway 25 into valve port 18 which is connected to suction line 9 of the compressor 1, thus completing the circuit of the refrigerant through the heat exchanging system. The suction line 9 is connected by line 15 to the passage 35 of the three-way valve 14. As shown in Fig. 2, at this time the valve port 42a is opened to connect lines 9 and 15 to the upper face of piston 24 through the chamber 43a, pipe 12 and nipple 30a of four-way valve 11. This relieves the pressure against the upper face of piston 24 while the pressure acting on the lower face of the piston maintains it in the position illustrated in Fig. 2.

Assume now that the temperature of room A drops a sufficient amount to cause the thermostatic switch 44 to close thus picking up solenoid armature 37 to close valve port 42a and simultaneously open valve port 42. Line 9 will no longer be connected to nipple 30a, but instead will be connected through the valve port 42 to chamber 43 which is connected to line 13 leading to nipple 30 in an end cap 21. This will relieve pressure acting against the lower end of piston 24 and allow the piston 24 to move downward toward end cap 21. With piston 24 abutting end cap 21, passageways 27 and 28 are moved into registry with the valve ports in cylindrical casing 16. The flow of fluid through the heat exchange circuit is now reversed and the heat exchange circuit operates in the following manner. Hot gas under pressure is delivered from compressor 1 to valve port 20. Passageway 27 guides the hot gas into valve port 17 which is connected to line 8. The hot gas passes through line 8 and enters the coil 7 where it gives up heat to the coils and becomes liquified. This creates an area of hot air around the coil 7 which is distributed into room A by the blower motor 10. The liquified fluid then passes through capillary 5 into the coil 4 where it is allowed to expand, absorbs heat from the surrounding atmosphere and becomes vaporized again. The gas then passes through line 3 to valve port 19 through passageway 28, and into valve port 18. Valve port 18 is connected to the suction line 9 of the compresser 1 thus completing the fluid circuit.

While I have illustrated but one embodiment of my invention, it will be readily apparent to those skilled in the art that it is susceptible to modification. For example, it is contemplated that the system herein disclosed could be adapted to be used as an automatic defroster for refrigeration units. Therefore, the disclosed embodiment should be considered as one example of many uses and the true scope of the invention is that defined in the following claims.

I claim:

1. In an air conditioning system comprising a compresser, a first heat exchanging coil located within the area in which the temperature is to be controlled, a second heat exchanging coil, a capillary tube connecting said first and second heat exchanging coils in series, and a blower adapted to circulate air about said coils; means for adapting said system for reverse cycle operation, said means comprising a four-way change over valve having a first port, a first fluid line connecting said first port to the pressure side of said compresser, a second port in said valve, a second fluid line connecting said second port to the suction side of said compressor, a third port in said valve, a third fluid line connecting said third port to said first heat exchange coil, a fourth port in said valve, a fourth fluid line connecting said fourth port to said second heat exchanging coil, connecting means within said valve for selectively establishing various predetermined fluid connections between said ports, automatic means for operating said connecting means, said automatic means comprising a three-way valve having a first port, a second port and a third port, fluid lines for connecting said first and second ports of said three-way valve to said four-way change over valve, a fifth fluid line connecting said third port of said three-way valve to said second fluid line, and thermostatically controlled means for selectively establishing a fluid connection between said third port of said three-way valve and either of said first and second ports of said three-way valve.

2. In a system adapted for reverse cycle operation, control means for automatically accomplishing a cycle reversal, said control means comprising a multiple port valve including a piston slidable between two end positions within said valve, means within said piston to provide a first set of connections between certain of said ports when said piston is at one of said end positions and to provide a second set of connections between certain of said ports when said piston is in the other of said end positions; a three-way valve having a first and a second port hydraulically connected to respective sides of said piston in said four-way valve, a third port in said three-way valve connected to a low pressure region in said system, means connecting both sides of said piston to a high pressure region in said system, and thermostatically controlled means for selectively connecting said third port to either of said first and second ports.

3. In a system adapted to reverse cycle operations, control means for automatically accomplishing a cycle reversal, said control means comprising a first valve having a cylindrical casing, a plurality of ports disposed symmetrically around the periphery of said casing, said ports having their axes lying in a common plane perpendicular to the axis of said cylindrical casing, a cap secured to each end of said cylindrical casing, a cap secured to each end of said casing, a piston slidably mounted within said casing, means to supply pressure between said piston and both of said caps, a valve operating nipple in each said caps, a second valve, said second valve having a pair of ports hydraulically connected respectively to each of said nipples, a third port in said second valve, means connecting said third port to a low pressure source, means within said valve to selectively disconnect either of said pair of ports from said third port, a solenoid mounted upon said second valve, said solenoid being so disposed as to operate said last mentioned means, and a thermostatically controlled switch operatively connected to said solenoid whereby the energization of said solenoid is controlled by a variation in temperature.

4. In a system adapted for reverse cycle operations, control means for automatically accomplishing a cycle reversal, said control means comprising a first valve having a cylindrical casing, a first, a second, a third, and a fourth port symmetrically disposed around the periphery of said casing, the axes of said ports lying in a common plane which is perpendicular to the axes of said cylindrical casing, a cap closing each end of said casing, a valve operating nipple in each of said caps, a piston slidable within said casing, a first set of passageways in said piston lying in a first plane, a second set of passageways in said piston lying in a second plane, said piston being so constructed that when said piston abuts against one of said end caps, said first set of passageways in said piston connects said first port with said second port and said third port with said fourth port, and when said piston abuts the other of said end caps, said second set of passageways connects said first port with said fourth port and said second port with said third port, means for supplying pressure to both sides of said piston, a three-way valve having a pair of openings, fluid lines connecting said openings respectively to said valve operating nipples, a third opening located in said three-way valve, means for supplying low pressure fluid to said third opening, means within said three-way valve for selectively connecting said third opening to either of said pair of openings, a solenoid mounted upon said three-way valve for operating said last mentioned means, and a thermostatically controlled switch operatively connected to said solenoid whereby the operation of said solenoid is controlled by variations in temperature.

5. A valve comprising a casing having a plurality of ports disposed symmetrically around the periphery of said casing, said ports having their axes lying in a common plane, a valve piston slidable in said casing, a valve operating passageway located at each end of said casing, and a restricted passageway in said casing connecting said valve operating passageways to one of said first mentioned ports.

6. A valve comprising a cylindrical casing having a plurality of ports disposed symmetrically around the periphery of said casing, said ports having their axes lying in a common plane perpendicular to the axis of said cylindrical casing, a cap secured to each end of said casing, a valve operating passageway in each of said caps, and a restricted passageway extending through said casing to connect said valve operating passageway with one of said first mentioned ports.

7. For use in a system including a high pressure region, a low pressure region and a heat exchange circuit adapted for reverse cycle operation; a valve comprising a cylindrical casing having a plurality of ports disposed symmetrically about its periphery, means connecting a first of said ports to one of said pressure regions, means connecting a second of said ports to the other of said pressure regions, means connecting said heat exchange circuit between a third and a fourth of said ports, a valve piston slidable within said casing between limits defined by end caps closing each end of said casing, said piston being operable at one of said limits to connect said first port to said third port and said fourth port to said second port and operable at the other of said limits to connect said first port to said fourth port and to connect said third port to said second port, a restricted passageway extending longitudinally of said casing hydraulically connecting said first port to the opposed faces of said piston to cause said one of said pressure regions to constantly apply a predetermined pressure between said end caps and said piston, and means for selectively connecting the other of said pressure regions to apply pressure therefrom between a face of said piston and the associated end cap to thereby obtain a differential pressure acting upon said piston to move said piston to one of said limits.

References Cited in the file of this patent

UNITED STATES PATENTS 2,672,887    Tipton                Mar. 23, 1954